US012596396B2

(12) United States Patent
Thiagarajan et al.

(10) Patent No.: US 12,596,396 B2
(45) Date of Patent: Apr. 7, 2026

(54) AUTONOMOUS ADAPTIVELY RECONFIGURABLE SYSTEM

(71) Applicant: Cypress Semiconductor Corporation, San Jose, CA (US)

(72) Inventors: Eashwar Thiagarajan, Bothell, WA (US); Bert Sullam, Bellevue, WA (US); Nidhin Mulangattil Sudhakaran, Lynnwood, WA (US); Andrew Page, Kirkland, WA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 293 days.

(21) Appl. No.: 17/990,096

(22) Filed: Nov. 18, 2022

(65) Prior Publication Data

US 2024/0168514 A1    May 23, 2024

(51) Int. Cl.
*G06F 1/12*        (2006.01)
*G06F 1/08*        (2006.01)

(52) U.S. Cl.
CPC . *G06F 1/12* (2013.01); *G06F 1/08* (2013.01)

(58) Field of Classification Search
CPC ........................................................ G06F 1/12
See application file for complete search history.

(56) References Cited

U.S. PATENT DOCUMENTS 3,231,340 A    *    1/1966    Gaska ....................... C01D 3/18
                                                                23/302 R
8,180,583 B1 *    5/2012    Gossweiler ........... G06F 1/3231
                                                                702/62

8,391,830 B1 *    3/2013    Puliatti ................... H04W 4/90
                                                                455/406
9,473,144 B1 *  10/2016    Thiagarajan ..... H03K 19/17712
9,594,411 B2 *    3/2017    Grokop ................. G06F 1/3234
2006/0053311 A1 *    3/2006    Chary ................... G06F 1/3296
                                                                713/300
2009/0055132 A1 *    2/2009    Cheng ..................... H04L 41/00
                                                                702/187
2011/0043275 A1 *    2/2011    Fuks ..................... G06F 1/3287
                                                                327/524
2012/0221884 A1 *    8/2012    Carter ................. G06F 11/0772
                                                                714/2
2012/0324259 A1 *  12/2012    Aasheim ........... H04W 52/0258
                                                                713/340
2013/0063349 A1 *    3/2013    Rankin ............... G06F 3/03547
                                                                345/158

(Continued)

*Primary Examiner* — Phil K Nguyen

(57) ABSTRACT

Implementations disclosed describe a programmable analog subsystem (PASS) having a plurality of reconfigurable analog circuits. The PASS may be coupled to an input/output device to receive an input signal and to an interface to communicate data with a central processing unit. A controller may be configured, based on a plurality of parameters stored at the controller, to configure the plurality of reconfigurable analog circuits into a first PASS state. The PASS may process the first input signal through the plurality of reconfigurable analog circuits in the first PASS state to generate a first output value based on the first input signal. Responsive to a trigger event, the controller may reconfigure the plurality of reconfigurable analog circuits into a second PASS state different from the first PASS state. The PASS may perform a function based on the first output value in the second PASS state.

20 Claims, 8 Drawing Sheets

(56)     References Cited

U.S. PATENT DOCUMENTS

| | | | | |
|---|---|---|---|---|
| 2013/0103212 A1* | 4/2013 | Andiappan | ............... | G06F 1/26 |
| | | | | 700/286 |
| 2014/0095757 A1* | 4/2014 | Snyder | ...................... | G06F 1/32 |
| | | | | 710/305 |
| 2014/0181536 A1* | 6/2014 | Naffziger | ............... | G06F 1/206 |
| | | | | 713/300 |
| 2014/0324745 A1* | 10/2014 | Leppanen | .............. | G06V 40/20 |
| | | | | 706/12 |
| 2015/0234443 A1* | 8/2015 | Kulathumani | ........ | G06F 1/3206 |
| | | | | 340/3.1 |
| 2016/0187961 A1* | 6/2016 | Elibol | ................. | G06F 13/4022 |
| | | | | 345/173 |
| 2020/0083889 A1* | 3/2020 | Thiagarajan | .............. | H03F 3/72 |
| 2021/0339774 A1* | 11/2021 | Kim | .................. | B60W 60/0053 |
| 2022/0113907 A1* | 4/2022 | Kobayashi | ............ | G06F 3/0604 |

* cited by examiner

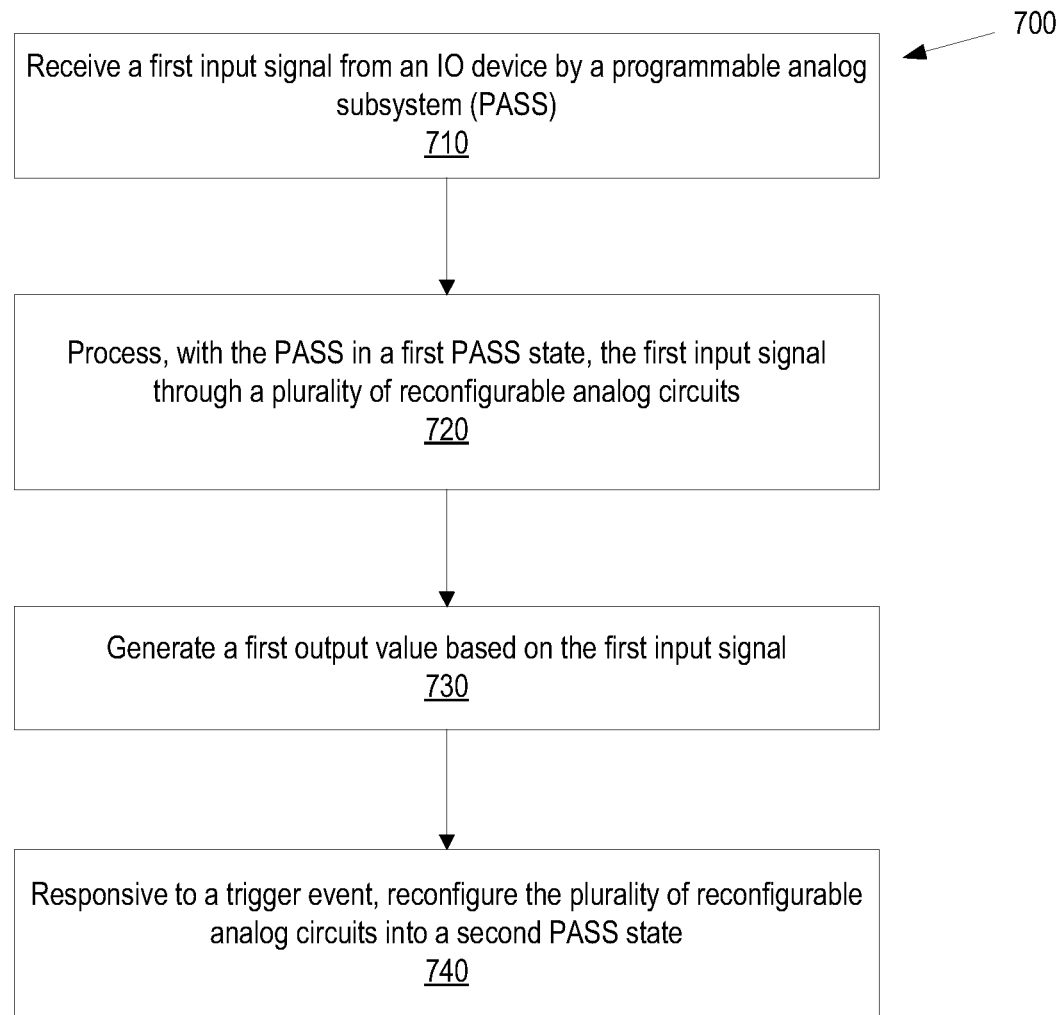

700

Receive a first input signal from an IO device by a programmable analog
subsystem (PASS)
710

Process, with the PASS in a first PASS state, the first input signal
through a plurality of reconfigurable analog circuits
720

Generate a first output value based on the first input signal
730

Responsive to a trigger event, reconfigure the plurality of reconfigurable
analog circuits into a second PASS state
740

FIG. 7

AUTONOMOUS ADAPTIVELY RECONFIGURABLE SYSTEM

TECHNICAL FIELD

The present disclosure pertains to integrated circuit (IC) devices having programmable analog blocks; more specifically, to optimizing performance and power management of IC devices by configuring and/or reconfiguring the programmable analog blocks via an autonomous controller.

BACKGROUND

Integrated circuit devices can include both analog and digital blocks. Analog blocks are often made reconfigurable to meet demands for multitask processing and facilitate optimal power management. Analog blocks can deliver functionality, such as making measurements and performing comparisons of measured quantities, which digital blocks cannot provide. In combination, analog and digital blocks can combine the flexibility of software instructions executed by digital blocks with the speed of analog hardware. While digital blocks are better at handling more computation-heavy tasks, analog blocks can deliver superior performance where speed and saving energy are critical. Accordingly, careful allocation of execution of various tasks between analog and digital blocks is important in order to optimize the speed, complexity, and energy efficiency of processing. This is especially crucial where integrated circuits are used in electronic medical devices, internet of things (IoT) devices, and various portable electronic devices with limited energy resources and where the benefits of effective power management can be particularly significant.

BRIEF DESCRIPTION OF THE DRAWINGS

FIG. 7 is a flow diagram of one possible implementation of a method of reconfiguration, in response to a trigger, of a low-power programmable analog subsystem, according to aspects of the present disclosure.

DETAILED DESCRIPTION

Figure 1:
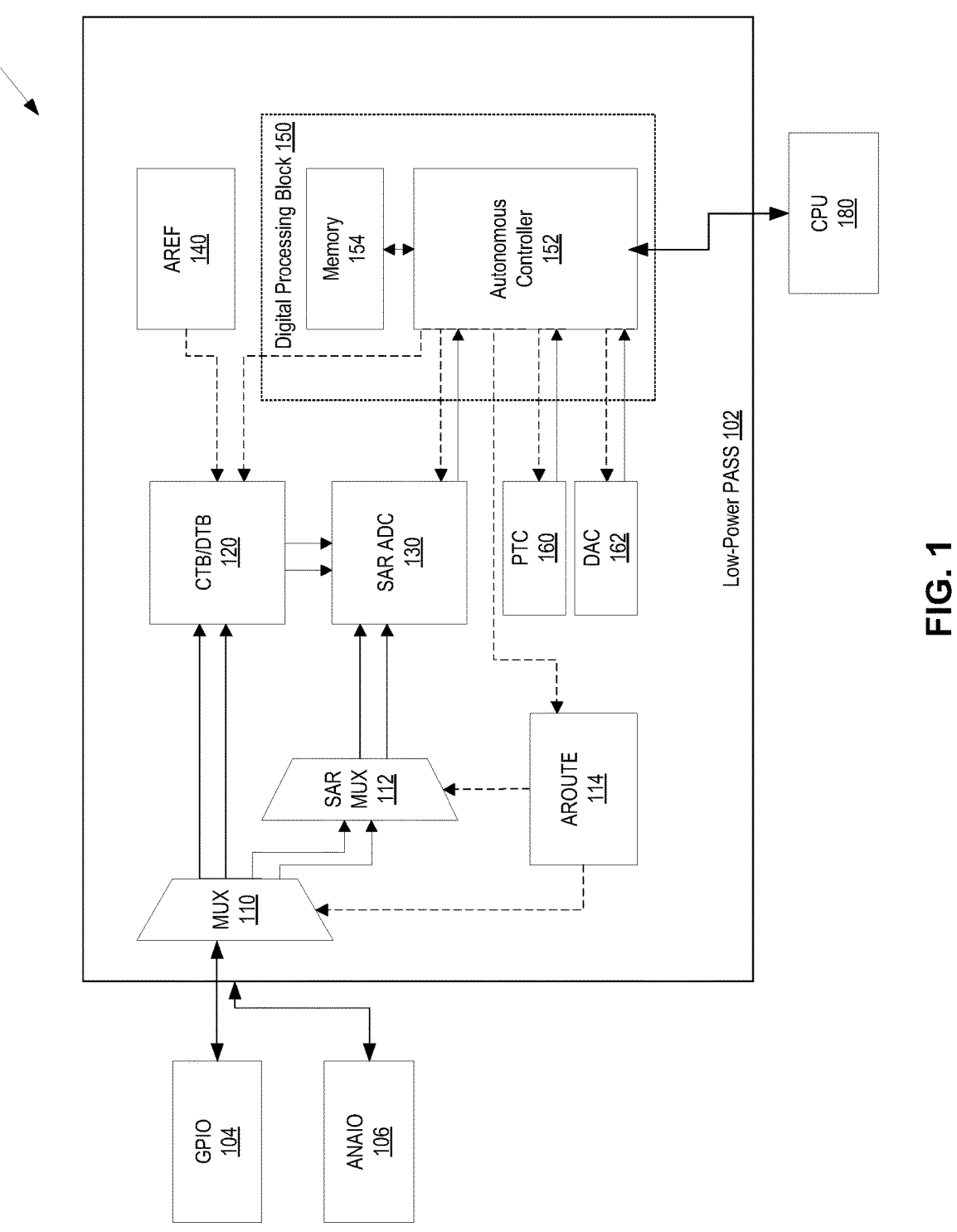
FIG. 1 is a block diagram of one exemplary implementation of a reconfigurable low-power programmable analog subsystem, according to aspects of the present disclosure.

Aspects and implementations of the present disclosure are directed at optimizing performance and power management of integrated circuit (IC) devices by utilizing autonomous reconfigurability of the analog circuits independent of the central digital processor, which may remain in a sleep mode or perform a different operation. The processor may be located in the same die/substrate as the analog circuits, or may be implemented separately. The analog circuits may be combined into a programmable analog subsystem (PASS) that may be used in combination with or, in some implementations, separately from a digital subsystem that may comprise a central processing unit (CPU) and a memory device. In some implementations, the digital subsystem may be a large-scale computing device, a general purpose processing unit (GPU), or an application processing unit (APU). In other implementations, the digital subsystem may be a microcontroller unit (MCU) with a CPU and memory designed to govern a specific operation. The microcontroller unit may be a separate circuit or a circuit embedded into a larger system. The PASS may use a logic circuit (in some implementations, e.g., an autonomous controller) for decision-making regarding reconfiguring one or more analog devices, such as input-output (IO) devices, routing devices, continuous time blocks (CTB), Discrete-Time Blocks, analog-to-digital converters (ADC). For example, upon the occurrence of a trigger event, the PASS may reconfigure one or more of its programmable analog circuits responsive to the trigger event. In some examples, the trigger event includes events such as the expiration of a set amount of time or an input or output data signal meeting a predetermined threshold. In many embodiments, the trigger event is set by a user who programs the trigger event to the PASS using commands as explained herein below. The trigger event may be indicative of a change of configuration state, meaning that the PASS may reconfigure one or more of its programmable analog circuits from a first state to a second state responsive to the trigger event. The PASS may perform such reconfiguration without waking up the CPU, if the CPU is in a sleep state, or without requesting the CPU instructions, if the CPU is in an active state.

Modern computing devices, especially automotive, wearable, hand-held, metering, appliance-integrated, and the like, require increasingly efficient power management. Many portable devices cram significant computational resources into small form factors. Compact dimensions may limit the capacity of portable devices for energy storage. Accordingly, optimizing energy consumption during execution of various tasks becomes increasingly crucial. Generally, executing a task faster by a minimal number of essential components leads to better utilization of energy resources.

A conventional IC may consist of a digital subsystem (e.g., a microcontroller unit) having a CPU and a reconfigurable analog subsystem. The digital subsystem may remain in a low-power sleep mode, while the analog subsystem may be in a mode with limited functionality. The analog subsystem may receive an input signal (e.g., a voice signal) through its front end module and provide the signal, after analog processing (e.g., decoding, filtering, and amplification), to an analog-to-digital converter, and then for digital pre-processing. The digital pre-processing output may indicate that the input signal meets certain threshold criteria or otherwise indicates an event (e.g., a trigger event). Responsive to such determination, the analog subsystem may communicate a wake-up instruction to the CPU. Subsequently, the CPU may execute instructions stored in the memory of the digital subsystem and reconfigure the parameters of the analog subsystem so that the analog circuits may provide functionality that is better adjusted to the changed conditions.

For example, the analog subsystem may monitor input signals for an occurrence of one or more conditions (e.g., trigger conditions), such as a drop in the ambient temperature below a certain pre-set minimum. Upon such an event, the analog blocks may wake up the CPU, which, upon execution of software or firmware, can turn on or adjust a heating system. Additionally, the CPU can reconfigure the analog blocks. After the heating system is turned on, the analog blocks can be reconfigured to monitor for a temperature rise above some pre-set maximum. The CPU and/or other digital blocks can then return to the low-power sleep mode, while the reconfigured analog blocks can further monitor the ambient temperature. When the maximum temperature is achieved, the analog blocks can trigger another processor wake-up for further digital processing (e.g., control of the heating system) and/or analog block reconfiguration. As a result, the power consumption can be greatly reduced.

Such an approach, however, has a number of shortcomings. It relies on the CPU functionality (processing power and instruction execution) for the reconfiguration of the programmable analog circuits. But the CPU can consume significant energy even while executing a minimal reconfiguration of the analog subsystem. Moreover, the CPU can take a considerable time to wake up from a sleep mode to an active state, so the power economy in the sleep mode may come at a price of delayed performance. Such a lack of reconfigurability of the analog circuits while the CPU remains in the sleep mode can, therefore, be a disadvantage where power management and processing speed are essential. In particular, in a situation where the CPU may be called upon to respond to multiple false alarms, utilization of computing resources can become suboptimal. This problem is further exacerbated when various analog blocks have fixed functionality (such as resolution or a range of parameters of monitoring) and can only be reconfigured with CPU involvement. As a result, in dynamic environments, when typical time intervals between monitored events or conditions become shorter than the times required for CPU wake-up and data processing, integrated circuits with CPU-only reconfigurable analog blocks become incapable of efficient power management.

Aspects and implementations of the present disclosure address this and other deficiencies of the existing ICs by providing autonomous configurability of programmable analog circuits without active CPU involvement or input. Various analog circuits may be combined into a low-power (LP) programmable analog subsystem (PASS), which may be capable of being in one of a plurality of states selectable in response to one or more received input signals or external conditions (e.g., trigger conditions) without CPU input. For example, the LP PASS may reconfigure itself into a different configuration while the CPU remains in a sleep state. In some implementations, the CPU may be in an active state, but the LP PASS may perform a reconfiguration without requesting CPU instructions. This may allow the CPU to perform other functions, such as processing of digital tasks that may be related or unrelated to the tasks that the LP PASS is performing. This may allow processing the same task faster if both the LP PASS and the CPU are processing different parts of the same task, or it may allow concurrent processing of different tasks by the LP PASS and the CPU.

A logic circuit may select the state of the LP PASS (e.g., an autonomous controller) by receiving a digital signal from an analog-to-digital converter (ADC) circuit, a comparator, or another type of analog circuit. The ADC circuit may receive one or more analog signals pre-processed by front-end analog circuits. The input signals received by the LP PASS may represent a variety of external conditions. In some implementations, the input signals may be radio waves, light signals, sound waves, indicators of motion, direction, speed, temperature, mechanical contact, chemical compositions, or any other signals that may be generated by environmental sensors representative of the state of physical or chemical environment surrounding the LP PASS. In some implementations, sensors may detect environments located at significant distances from the LP PASS.

FIG. 1 is a block diagram of one exemplary implementation 100 of a reconfigurable LP PASS, according to aspects of the present disclosure. The LP PASS 102 may be connected to one or more input-output (IO) devices of an apparatus to receive input signals from one or more signal sources. The IO devices may include one or more general-purpose, input-output (GPIO) ports 104 or analog only input-output (ANAIO) blocks 106, which may comprise a plurality of pins, switches, or sensors capable of delivering to the LP PASS 102 input signals as described above. In some implementations, various IO devices (e.g., temperature sensors, pressure sensors, etc.) may be mounted on the same chip (e.g., same Si substrate) as the LP PASS 102. In other implementations, some or all of the IO devices may be external to the LP PASS 102 but communicatively coupled to it.

The signals input through the IO devices may be routed to various analog blocks via a plurality of multiplexers (MUX). FIG. 1 shows an exemplary system with two MUXs 110 and 112. Additional MUXs may be present in other implementations to route input data from a plurality of the IO devices to various circuits in the LP PASS. For example, additional MUXs may route input data to PTC 160 and/or DAC 162. The processing paths for the input signals are shown in FIG. 1 as solid lines, with the arrows indicating the direction of signal propagation. Not all processing paths (e.g., from the inputs to PTC 160 and/or DAC 162) may be shown. In some implementations, some of the input signals may be routed to a continuous time block (CTB) 120 for continuous time domain processing. In CTB 120, various input signals may be decoded, amplified, converted (e.g., from current to voltage signals, or from current to time signals, or from voltage to time signals, or from voltage to frequency signals, and so on) compared, buffered, or similarly processed. In some implementations, a discrete time block (DTB), for signal processing at discrete times, may be used in place of a CTB or in addition to a CTB. The CTB/DTB 120 outputs may be input into an ADC, such as a successive approximation register (SAR) ADC 130, in one exemplary implementation. The SAR ADC 130 may transform the analog input signals into digital signals. The system of multiplexers may route some input signals directly to the SAR ADC 130, bypassing the CTB/DTB 120. For example, in some implementations, a dedicated SAR MUX 112 may be used to route input signals intended to be provided directly to the SAR ADC 130. An analog routing block (AROUTE) 114 may provide control data (such as the configuration of switches) for some or all of the MUXs of the LP PASS 102. The AROUTE 114 may provide signal routing data to facilitate connectivity between the IO devices and a plurality of analog blocks, such as the CTB/DTB 120 and the SAR ADC 130. Different configurations of the LP PASS 102 may have different routing fabrics. For example, in some configurations intended for rough speech detection, a sound input signal from a microphone input may be delivered through SAR MUX 112 directly to SAR ADC 130. In some implementations, an analog signal indicative of temperature may be routed by one or more MUXs from the inputs (e.g., GPIO 104 and/or ANAIO 106) to the PTC 160. The PTC 160 may provide an output signal and/or request and/or status signal(s) to the autonomous controller 152. In some implementations, a digital signal may be received by the DAC 162 from the autonomous controller 152. The DAC 162 may convert the digital signal into an analog output that is routed to GPIO 104 and/or ANAIO 106 via one or more MUXs and/or other routing not shown in FIG. 1.

In other configurations, in contrast, when more accurate speech recognition is intended, the sound input from a microphone may be first routed to the CTB/DTB 120 for continuous or discrete time processing. As a further example, in an instance of smoke detection, the routing fabric may direct input signals to SAR ADC 130, but once the presence of smoke has been established, the LP PASS 102 may be reconfigured (e.g., responsive to a command from the autonomous controller 152) into a different configuration with the input signals routed through the CTB/DTB 120 for additional processing intended to determine smoke composition. By providing control signals to the MUXs, the AROUTE 114 may facilitate such input signal rerouting. In some implementations, the LP PASS 102 may include one or more buses. In some implementations, the LP PASS may include a fabric of buses. In some implementations, routing via buses may be controlled by the AROUTE 114, providing control signals to the MUXs 110 and 112. In some implementations, some buses may provide direct signal routing to various blocks of the LP PASS 102 and/or the MUXs 110 and 112.

The SAR ADC 130 may convert one or more signals (e.g., continuous-time signals) into one or more digital signals. The SAR ADC 130 may use a binary search with a resolution that may depend on the specific configuration of the LP PASS 102. For example, in the default configuration of the LP PASS, for detection of some quantity A, the SAR ADC 130 may be configured to output just a single bit with the values 0 or 1 corresponding to the quantity A being below or above a certain predetermined threshold value. Once the quantity A has been above the threshold value for a certain amount of time (e.g., cumulatively for more than 5 of the last 10 seconds), the SAR ADC 130 may be reconfigured into a state where the output value is specified with two bits (e.g., states 00, 01, 10, 11), three bits (001, 101, etc.), or more, depending on the required resolution.

The functionality of the analog circuits (such as MUXs, CTB, PTC, DAC, and SAR ADC) may be supported by an analog reference block (AREF) 140, in some implementations. AREF 140 may provide reference voltages and reference currents to other analog blocks. For example, AREF 140 may provide bandgap voltage, low voltage, high voltage, and the like. In some non-limiting examples, the low voltage may be 1.1 V, while the high voltage may be within the range of approximately 2.7-5.5 V or any other range of values. AREF 140 may similarly provide reference currents to various analog blocks. In some implementations, reference voltages and reference currents may be specific to the analog block to which they are provided. In some implementations, reference voltages and reference currents may be temperature-independent. In some implementations, reference voltages and reference currents may be proportional to temperature or may have some other predetermined temperature dependence. In some implementations, AREF 140 may have a repeater capability such that multiples of the reference voltages (and/or currents) may be provided to various analog circuits. AREF 140 may further provide clock signals for various analog circuits. In some implementations, AREF 140 may provide different clock signals to different analog circuits.

The signals processed by the analog blocks (and circuits within those blocks) may be input into a digital processing block 150 of the LP PASS 102. For example, as illustrated by a solid line in FIG. 1, a digital signal may be delivered from SAR ADC 130 to an autonomous controller 152 of the digital processing block 150. The autonomous controller 152 may include a plurality of interconnected logic gates. The autonomous controller 152 may be capable of executing instructions stored in a memory device 154, henceforth simply referred to as memory 154. Memory 154 may be a read-only memory (ROM), in some implementations. In other implementations, memory 154 may be a random access memory (RAM), a flash memory, any other type of memory, or a combination of different types of memory devices.

The autonomous controller 152 may process one or more digital status input signals provided by SAR ADC 130 corresponding to various analog inputs of the LP PASS 102. For example, speech recognition digital input signals may be processed together with temperature, humidity, atmospheric pressure, and/or other digital input signals. In some implementations, different digital input signals may be processed by different gates of the autonomous controller 152. In other implementations, different digital input signals may be processed by the same gates of the autonomous controller 152 but sequentially in time, e.g., so that the processing of the digital input signal s1 may occur over time interval t1, followed by the processing of the digital input signal s2 over time interval t2, followed again by the processing of the digital input signal s1, and so on. The digital outputs of the processing of the various digital inputs by the autonomous controller 152 may be temporally, permanently, or until the next boot, stored in the memory 154. In some implementations, the autonomous controller 152 is in communication with a CPU 180. Input and/or output signals may be received and/or sent by the autonomous controller 152 to/from the CPU 180. In some implementations, control signals and/or data can be shared between the autonomous controller 152 and the CPU 180. For example, the autonomous controller 152 may send a wakeup signal to the CPU 180 under certain conditions described herein. In another example, data indicative of the state of an analog circuit can be send by the autonomous controller 152 to the CPU 180.

The digital outputs of the autonomous controller 152 may be used to reconfigure various analog blocks and circuits of the LP PASS 102 via standardized interfaces between the autonomous controller 152 and the various analog blocks, as indicated schematically by the dashed lines in FIG. 1. For example, the dashed lines extending from the Autonomous controller 152 to the AROUTE 114 indicate schematically how reconfiguration of the AROUTE 114 may be performed. In turn, the dashed lines from the AROUTE 114 to the MUXs 110 and 112 indicate that the routing of data by the MUXs 110 and 112 may be reconfigured by the autonomous controller 152, by the CPU 180, and/or by the AROUTE 114, e.g., by reconfiguring one or more MUX switches. For example, the LP PASS 102 may be in a first—e.g., a low-power—configuration where the analog blocks (such as CTB/DTB 120, SAR ADC 130) may be configured to process analog input signals with a low resolution compared with the maximum capabilities of the LP PASS. The LP PASS 102 and its autonomous controller 152 may nonetheless remain in a stand-by mode capable of monitoring for indications of some events in the analog input signals. For example, the LP PASS 102 may be monitoring audio noise for the instances of human speech. The LP PASS 102 may not be capable of conclusively discerning speech at the lowest LP PASS resolution, but the autonomous controller 152 may be able to detect indicia of human speech. For example, the memory 154 may store criteria—such as typical tones and cadence—of a human speech at the set low resolution. If the LP PASS 102 is monitoring the analog input signals for an indication of some event and such indication is obtained in an ultra-low power configuration, which can also be a low-resolution mode, the autonomous controller 152 may reconfigure one or more of the analog circuits into a second configuration of the LP PASS 102 to increase the resolution of the analog signal processing and/or analog-to-digital conversion. Correspondingly, the analog circuits may have a higher operating power in the second configuration than in the first configuration. In some implementations, the analog circuits may have a lower operating power in the second configuration than in the first configuration. For example, the first configuration may be used to implement an Active state, whereas the second configuration may be used to implement a Sleep state of the LP PASS. As discussed in more detail below, several Active states (such as Active1, Active2, and so on) are characterized by different levels of the LP PASS functionality and different levels of power consumption. Likewise, there may be different Sleep states (such as Idle, Deep Sleep, and so on).

Different LP PASS configurations may be characterized by different resolutions of the continuous time processing of the input signals as well as different resolutions of the output digital signals. For example, digital resolution may be increased from 8 bits to 12 bits and from 12 bits to 16 bits when the LP PASS 102 is reconfigured. The increase in digital resolution may be responsive to a configuration command output by the autonomous controller 152. Higher resolution may require longer processing time and/or more power consumption. Because losing the lowest resolution may result in the fastest processing and/or lowest power conversion, the LP PASS 102 may start processing in the lowest resolution configuration but may reconfigure itself (e.g., may reconfigure SAR ADC 130) responsive to detection of indicia of specific events (e.g., trigger events).

In some implementations, to reconfigure the LP PASS 102 into the second configuration, the autonomous controller 152 may reconfigure some or all of the blocks CTB/DTB 120, SAR ADC 130, AREF 140, AROUTE 114, MUX 110, and SAR MUX 112 (e.g., by sending one or more configuration control signals). For example, to increase the resolution of continuous time processing, the autonomous controller 152 may execute instructions to AREF 140 to increase the frequency of the clock signal output by AREF to CTB/DTB 120. In another example, to increase the resolution of analog-to-digital conversion, the SAR ADC 130 and CTB/DTB 120 may be reconfigured from, e.g., a 12-bit 20 kilo-samples per second (ksps) sampling mode to a 12-bit 1 mega-samples per second (msps) sampling mode. In some implementations, the sampling rate may remain the same, but the resolution may increase. Conversely, the sampling rate, but not the resolution, may be increased. In some implementations, the autonomous controller may reconfigure a finite state machine based on one or more selectable states. For example, the finite state machine may be reconfigured based on one or more instructions received from the autonomous controller selecting a state from a group of multiple states of the finite state machine.

Figure 2A:
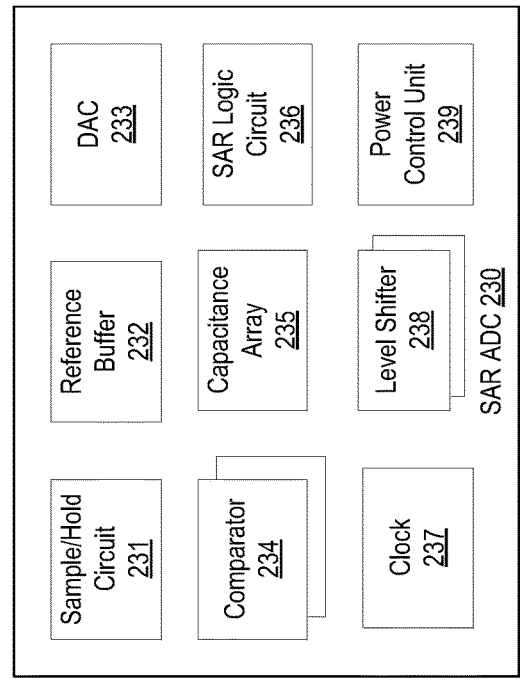
FIG. 2A is a block diagram of one exemplary implementation of a continuous time block (or a discrete time block) of an exemplary low-power programmable analog subsystem, according to aspects of the present disclosure.
Figure 2B:
FIG. 2B is a block diagram of one exemplary implementation of a successive approximation register analog-to-digital converter circuit of an exemplary low-power programmable analog subsystem, according to aspects of the present disclosure.
Figure 2C:
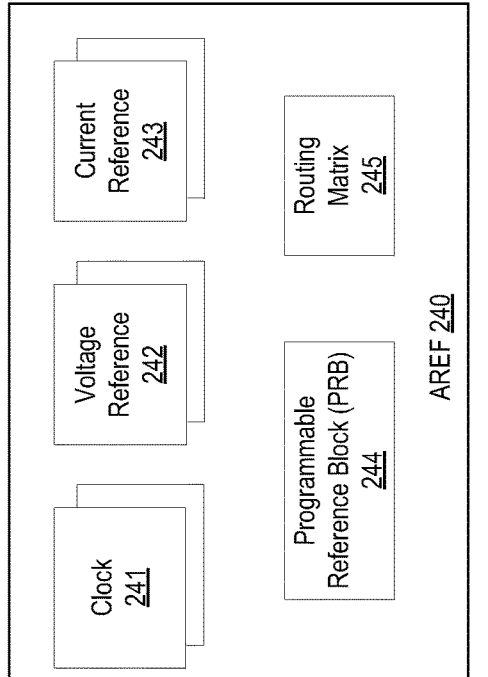
FIG. 2C is a block diagram of one exemplary implementation of an analog reference block of an exemplary low-power programmable analog subsystem, according to aspects of the present disclosure.

FIGS. 2A, 2B, and 2C illustrate some possible high-level architectures of a continuous time block (CTB), successive approximation register (SAR ADC), and analog reference block (AREF), according to aspects of the present disclosure. Some of the components shown in FIGS. 2A, 2B, and 2C, as well as those in subsequent FIGS. 3 and 4, may be the same as in FIG. 1. Accordingly, items referenced by the three-digit numbers that differ only by the first digit (e.g., CTB/DTB 120, 220, 320), may refer to the same components. Connections described herein between individual components may not be illustrated in the corresponding figure. Additionally, connections between components which are not illustrated may nevertheless exist in some implementations.

FIG. 2A is a block diagram of one exemplary implementation of CTB/DTB 220 of an exemplary LP PASS 102, according to aspects of the present disclosure. The CTB/DTB 220 may have sufficient bandwidth to support specified digital sampling rates, such as 12-bit sampling at 1 msps or 16-bit sampling at 62.5 ksps. In some implementations, CTB/DTB 220 may have two or more operational amplifiers 221 and a resistor network 222. In some implementations, CTB/DTB 220 may further include a pump 223, which may be a dual-charge pump. The pump 223 may be used to facilitate operations of the op-amps 221. In some implementations, the CTB/DTB 220 may include an internal logic circuit 224 to control internal routing with firmware-controllable switches. The routing matrix 225 may have a plurality of buses, switches, and latches. The routing matrix 225 may also have multiplexers internal to CTB/DTB 220 that are different from MUX 110. Some or all of the routing switches may be controllable by the components external to CTB/DTB 220, such as the autonomous controller 152 and the AROUTE 114. The routing matrix 225 may connect the CTB/DTB 220 to a plurality of IO pins of the IO devices, such as GPIO 104 and ANAIO 106, in some implementations. GPIO pins may be grouped into groups of eight pins, which may represent separate analog ports. The CTB/DTB 220 may further include a decoder 226 to process encoded inputs. The CTB/DTB 220 may also have a capacitor circuit 229 (e.g., an array of capacitors) for discrete-time processing. The components of the CTB/DTB 220 (e.g., the op-amps 221 and the resistor network 222) may be configured to serve as one or more buffers 227 or comparators 228. Some of the components of the CTB/DTB 220 shown in FIG. 2A may be optional and not used in some implementations. For example, the capacitor circuit 229 may not be present in a continuous time block (CTB) implementation of the CTB/DTB 220. In some implementations, a more compact CTBm (CTB-mini) may be used with the same or similar functionality as a typical CTB, but with a smaller capacity.

FIG. 2B is a block diagram of one exemplary implementation of a successive approximation register analog-to-digital converter circuit (SAR ADC) 230 of an exemplary LP PASS 102, according to aspects of the present disclosure. The SAR ADC 230 may include a sample/hold circuit 231 to capture the analog input signals (e.g., signals from the SAR MUX 112 and/or CTB/DTB 220) based on a specified sampling frequency. The SAR ADC 230 may also have a reference buffer 232 to store the reference signals (e.g., reference voltage and current) provided by AREF 140. The SAR ADC 230 may also have a digital-to-analog converter (DAC) 233 which may, at discrete time intervals, feed the analog signals into one or more comparators 234. The DAC 233 may also include or be coupled to a capacitor array 235. The comparator(s) 234 may compare input signals stored in the sample/hold circuit 231 with the output of DAC 233, determine the corresponding difference, and send this difference to the SAR logic circuit 236. The SAR logic circuit 236 may perform a successive approximation algorithm until the analog signals stored in the sample/hold circuit 231 are digitized to the accuracy specified by the number of bits of the digital output of SAR ADC 230, e.g., 8-bit, 12-bit, 16-bit, depending on the configuration. The SAR ADC 230 may use clock 237 for digital sampling of the analog input signals. The clock may incorporate a timing logic, which may provide different sampling rates at different stages of the analog-to-digital conversion. In some implementations, the SAR ADC 230 may further deploy level shifter(s) 238 to convert low voltage digital control signals into higher voltage analog control signals for an improved signal-to-noise ratio and decreasing power consumption by the SAR ADC 230. The SAR ADC 230 may further include a power control unit 239. Some of the components of the SAR ADC 230 shown in FIG. 2B may be optional and not used in some implementations.

FIG. 2C is a block diagram of one exemplary implementation of an analog reference block 240 of an exemplary LP PASS 102, according to aspects of the present disclosure. AREF 240 may include a clock 241 capable of providing a plurality of configurable clock references to the analog circuits of the LP PASS 102. For example, clock(s) 241 can provide clock references to the pump 223 of the CTB/DTB 220, the clock 237 of the SAR ADC 230, and so on. The voltage reference block(s) 242 may provide precise voltage references to some or all of the analog blocks (and circuits inside the blocks) of the LP PASS 102. For example, the voltage reference block 242 may provide bandgap voltage references, an analog ground voltage reference, an analog power supply voltage reference, and the like. Different analog blocks may receive different voltage references. The current reference block(s) 243 may provide precise current references to some or all of the analog blocks. For example, this may include a current that is proportional to absolute temperature (IPTAT), a current that is independent of absolute temperature (IZTAT), and a current that is complementary (i.e., decreasing with) absolute temperature (ICTAT). Providing a plurality of voltage and current reference values may be facilitated by a programmable reference block (PRB) 244, in some implementations. The PRB 244 may take an input reference voltage (or current) provided by the voltage reference block 242 (current reference block 243), multiply it by a constant, and output multiple divided versions of the obtained voltage (current) value for uses in different blocks of the LP PASS. The output reference voltages (currents) may be routed to the corresponding analog blocks by AROUTE 114. Likewise, clock 241 outputs may also be delivered to the intended destinations by AROUTE 114. The above-described operations—voltage/current multiplication and division—performed by the AREF 240 may be facilitated by internal routing matrix 245. The PRB 244 can receive reconfiguration instructions from the autonomous controller 152. Responsive to receiving such instructions, the PRB 244 may adjust the voltage or current references produced and output by the AREF 240. Some of the components of the AREF 240 shown in FIG. 2C may be optional and not used in some implementations.

Figure 3:
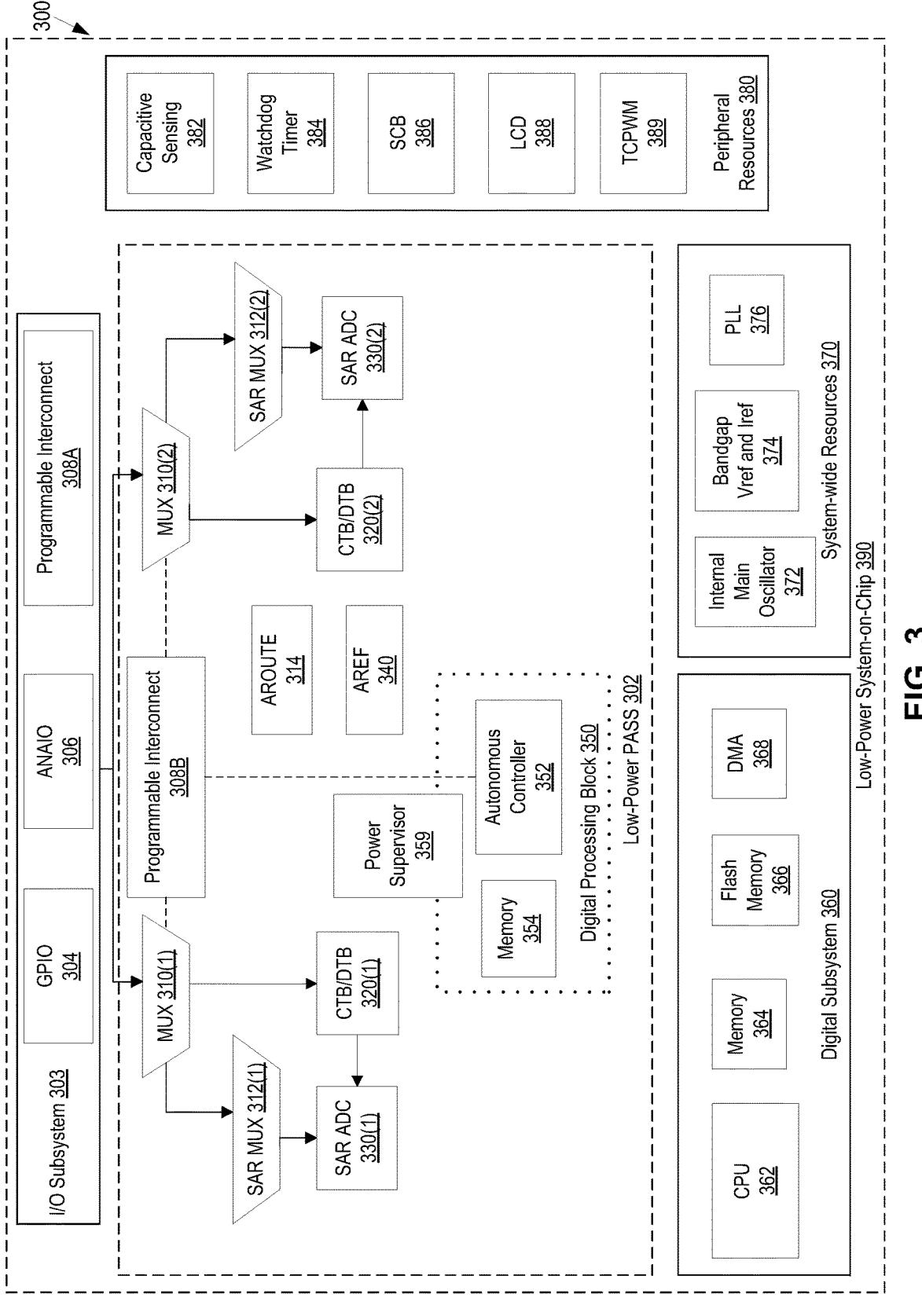
FIG. 3 is a block diagram of another exemplary implementation of a reconfigurable low-power programmable analog subsystem integrated with a digital subsystem, input/output subsystem, and system-wide and peripheral resources, according to aspects of the present disclosure.

FIG. 3 is a block diagram of an exemplary implementation 300 of a reconfigurable LP PASS 302 integrated with a digital subsystem 360, input/output subsystem 303, and peripheral resources 380, according to aspects of the present disclosure. The IC system shown in FIG. 3 may be used in a variety of applications, for example, but not limited to Internet-of-Things (IoT), wearables, motion detectors, voice-activated control appliances, smart home appliances, portable appliances, battery-operated appliances, automotive devices, chemical sensing, medical electronics (e.g., glucose, heart monitoring), and many others. The LP PASS 302 may be in one of a plurality of configurations that differ from each other by the functionality and power consumption and may be used to implement different states of the LP PASS 302, e.g., DeepSleep, Sleep, Active, in some implementations. Additional states may be implemented, if advantageous in specific applications. For example, a group of Active states may include a number of different states, e.g., Active1, Active2, Active3, and so on, which may differ by the amount and complexity of processing that may be performed by the LP PASS 302. For example, a SAR ADC in Active1 state may operate in a 12-bit low sampling mode, whereas in Active3 state it may operate in a 16-bit high sampling mode. The digital subsystem 360 may likewise be in one of a plurality of states. In one of such states, a CPU Off State, the central processing unit (CPU) 362 of the digital subsystem may be inactive. In another state, CPU 362 may be fully active, a CPU On State. Additional intermediate states where CPU 362 may be partially active with different degrees of CPU functionality may also be realized in some implementations.

The LP PASS 302 may include the same blocks as the LP PASS 102 illustrated in FIG. 1. Some of the blocks of LP PASS 102 may be included more than once in LP PASS 302. For example, in an implementation illustrated in FIG. 3, there are two sets of MUXs, CTBs, SAR ADCs, Memory devices, Registers, and finite state machines (FSMs). Each set, designated with the characters (1) and (2) added to the reference numbers, may perform separate processing of the analog signals input through the IO subsystem 303. Each set may be reconfigured independently by the autonomous controller 352 and a set-designated FSM. In some implementations, one or more of the devices, indicated as separate in FIG. 3, may be shared between the two sets. In some implementations, the system illustrated in FIG. 3 may include further sets having additional CTBs, SAR ADCs, and other blocks. Additional sets (third, fourth, . . . ) may be present in other implementations.

The functionality of the multi-set LP PASS 302 may be similar to the functionality of the single-set LP PASS 102. The IO subsystem may include GPIO 304, ANAIO 306, and Programmable Interconnect (PI) 308A. The PI 308A may control what input signals are delivered to the LP PASS 102 from the GPIO 304 and/or ANAIO 306. The LP PASS may additionally have a PI 308B as part of the LP PASS 302. In some implementations, the PI 308B may distribute incoming analog signals between different sets of analog circuits. For example, chemical and physical sensing inputs may be directed to MUX 310(1), while audio signals may be directed to MUX 310(2). Routing of signals inside the LP PASS 302 may be done by the AROUTE 314 and reference values to both sets of analog circuits provided by the AREF 340. The autonomous controller 352 may be configured to receive digital inputs from some or all CTBs 320 and to produce one or more digital output values. Some of the output values may be binary functions (0 or 1) of the analog input signals. For example, the input sound signal may result in the binary output 1 if the input contained a code word and in the binary output 0 if the input did not contain the code word. Some output values may be multi-bit digital numbers which may represent analog input signals in a quasi-continuous manner. For example, a detected ambient temperature or chemical composition of air or water may be represented by a quantity having a significant resolution (e.g., which may lead to heightened accuracy). The PI 308B may be controlled by the autonomous controller 352, which may control how input signals are distributed within the LP PASS 302 by reprogramming the PI 308B, as shown schematically in FIG. 3 by dashed lines. The LP PASS 302 may also have a power supervisor 359 to control a power level of the LP PASS as well as the timing of for powering up/down of various blocks of the LP PASS 302. Timing may include specific instances of powering up/down (including a complete or partial reduction in power) as well as the duration of the powering up/down transitions. The power supervisor 359 may provide supervisory functionality to both the analog blocks of the LP PASS 302 and the digital processing block 350. The power supervisor 359 may be controlled by the autonomous controller 352. For example, the power supervisor 359 may be controlled by the autonomous controller 352 via a control signal connection (not illustrated). In some implementations, the power supervisor 359 may have its own internal logic and be capable of operating autonomously from the autonomous controller 352.

The autonomous controller 352 may determine if one or more output values satisfy a first criteria (e.g., one or more criterion). The first criteria may be associated with a first trigger event and/or a first trigger condition. In some implementations, the first trigger event and/or condition is specified (e.g., by a user). For example, a user (e.g., a technician, an engineer, etc.) can input instructions reflective of the trigger event and/or condition. In some examples, the instructions are plain text instructions indicative of a configuration state of the LP Pass 302 that are input via a graphical user interface (GUI). In some implementations, the first criteria may be represented by a first threshold value, and the first criteria are satisfied if the output value exceeds the first threshold value (e.g., the trigger condition is met). In some implementations, the first criteria are satisfied if the output value is below the first threshold value. The plural term "criteria" is understood in the present disclosure as encompassing both its dictionary—plural—meaning and the related singular meaning ("criterion"). Accordingly, the term "first criteria" (or "second criteria" and the like) encompasses implementations where a single output value may be compared with a single threshold value as well as implementations where a plurality of output values may be compared with a plurality of threshold values. Similarly, a singular term "threshold value" should be understood as also encompassing implementations having a plurality of threshold values.

The first threshold value may be stored in memory 354. In some implementations, the first threshold value may be stored in the registers of the sub-blocks (e.g., CTB/DTB 320(1) or 320(2), SAR ADC 330(1) or 330(2), etc.). In some implementations, the first threshold value may be stored in the settings of the sub-blocks. If it is determined that the first criteria are satisfied (e.g., the first trigger condition is met), the autonomous controller 352 may reconfigure the LP PASS 302 from a first PASS configuration to a second PASS configuration having a different configuration setting. The configuration setting may include parameters that determine a functionality of at least one programmable analog circuit, such as clock rate of CTB/DTB 320, resolution and sampling rate of the SAR ADC 330, routing fabrics of AROUTE 314, analog references of AREF 340, and the like. The setting(s) for the second PASS configuration may be stored in memory 354, registers of the sub-blocks, or in the settings of the FSMs of the sub-blocks. In some implementations, registers 356 may be implemented in ROM, and configuration settings stored in them may not be modified. In some implementations, registers 356 may be RAM-implemented and may be modified by the CPU 362 of the digital subsystem 360. In some implementations, some configuration settings may be stored in RAM (either memory 354 or registers 356), while other configuration settings may be stored in ROM (either memory 354 or registers 356). In some implementations, configuration settings may be stored in registers 356, whereas data collected by the LP PASS 302 may be stored in memory 354. In some implementations, the configuration settings may represent the states of one or more switches of one or more of CTB/DTB 320, SAR ADC 330, AROUTE 314, AREF 340, and the like.

In some implementations, the LP PASS 302 in the second configuration may not receive a second analog input signal. Rather, upon reconfiguration (and without waking up CPU 362), the LP PASS 302 may re-process the first analog input signal stored during the initial processing that was performed in the first PASS configuration. For example, the first analog input signal may be stored in the sample/hold circuit 231 of the SAR ADC 330. After the LP PASS 302 is reconfigured into the second configuration, e.g., having a higher SAR ADC sampling rate, the reconfigured SAR ADC 330 and the autonomous controller 352 may re-process the stored input signal with a new (higher) resolution to determine a new output value. This new output value may then be compared to the second threshold value, and a decision may be made on whether to wake up the CPU 362 from its Off State.

In some implementations, after receiving and processing the analog input signals, the LP PASS 302 may output to the CPU 362 a signal that is different from a wake-up signal. In some implementations, the signal output to the CPU 362 is a mode selection signal. For example, in some implementations, the CPU 362 may be initially in the CPU On State, and the autonomous controller 352 may output a signal to the CPU 362 that causes the CPU 362 to transition to the CPU Off State. In some implementations, the mode selection signal may cause the CPU 362 to transition between different active modes (states).

In some implementations, the LP PASS 302 may output a no-wake-up instruction to the CPU while undergoing multiple reconfigurations into configurations with progressively escalating functionality (e.g., speed, accuracy, and resolution) and power consumption before the CPU 362 is finally woken up. For example, the sequence of LP PASS states may be: Sleep, Active1, Active2, Active3, followed by a wake-up instruction to the CPU 362. In some implementations, the LP PASS 302 may reverse and deescalate without waking the CPU 362 if it is determined that no active CPU involvement or input is necessary: Active1, Active2, Active3, Active2, Active1. In some implementations, the LP PASS 302 may deescalate into Sleep (or DeepSleep) state. In some implementations, the LP PASS 302 may periodically reconfigure itself into one of the Active states at the beginning of a monitoring time period and revert back into Sleep (or DeepSleep) state at the end of such period.

The digital subsystem 360 may be a general-purpose processing system or a special-purpose processing system configured to execute a limited number of instructions. In some implementations, the digital subsystem 360 may be a microcontroller unit (MCU). The digital subsystem 360 may include flash memory 366, direct memory access circuit (DMA) 368, as well as other conventional components, such as monitors, IO devices, network adapters, and so on. The digital subsystem 360 may have access to a cloud storage. Some or all of the computing performed by the digital subsystem 360 may be a remote (e.g., cloud) computing.

The system may have a number of system-wide resources 370, such as an internal main oscillator 372 and a reference block 374 to provide voltage and current to the components of the digital subsystem and, in some implementations, to AREF 340. The system-wide resources may also include a phase lock loop (PLL) 376 to generate phase-locked reference signals. The system may also have a number of peripheral resources 380, which may include capacitive sensing arrays 382, a watchdog timer 384, a serial communication block 386, a liquid crystal display 388, and a timer counter pulse width modulator (TCPWM) 389.

In some implementations, all components of the system may be implemented on the same chip (substrate), as illustrated by the dashed rectangle Low-Power System-on-Chip (SoC) 390. In some implementations, some of the components of the system may be implemented off-chip. For example, some or all of the peripheral resources 380 and/or 10 subsystem 303 may be implemented off-chip and connected to the chip hosting the LP PASS 302 and the digital subsystem 360 by one or more buses (not shown). In some implementations, the LP PASS 302, and the digital subsystem 360 may be implemented as separate SoCs on different substrates (e.g., discrete silicon).

Figure 4:
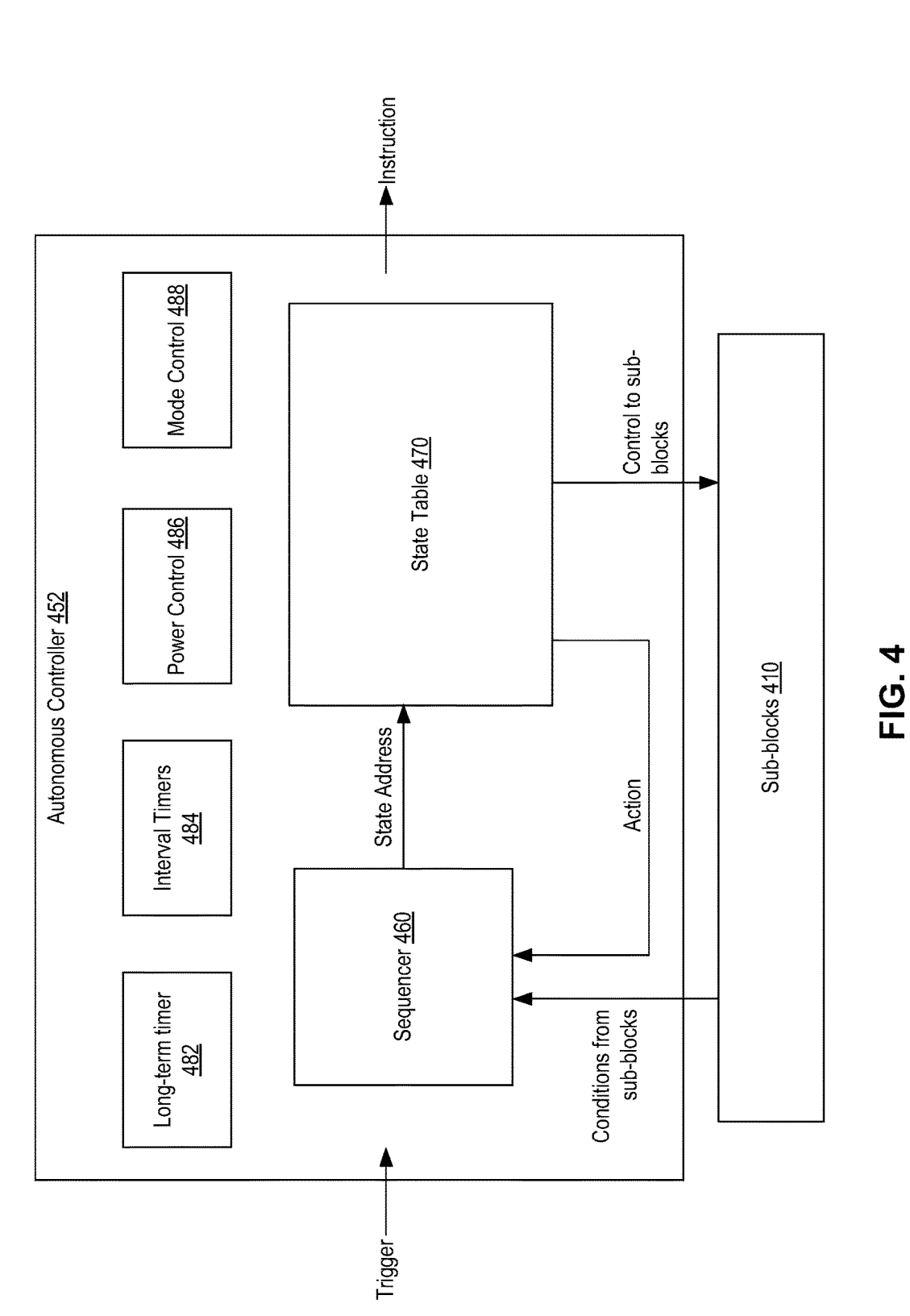
FIG. 4 is a block diagram of one exemplary implementation of an autonomous controller of a reconfigurable low-power programmable analog subsystem, according to aspects of the present disclosure.

FIG. 4 is a block diagram of one exemplary implementation 400 of an autonomous controller 452 of a reconfigurable low-power programmable analog subsystem, according to aspects of the present disclosure. In some implementations, autonomous controller 452 is similar (e.g., substantially similar or the same as) autonomous controller 352 of FIG. 3 and/or autonomous controller 152 of FIG. 1. The autonomous controller 452 may be configured to cause the reconfiguration of multiple analog circuits (e.g., sub-blocks 410) of a PASS (e.g., LP PASS 102, LP PASS 302, etc.). In some implementations, sub-blocks 410 correspond to analog sub-blocks, such as SAR ADC 130, 230, 330; CTB/DTB 120, 220, 320; AREF 140, 240, 340; AROUTE 114, 314; etc. The sub-blocks 410 may be communicatively coupled to the autonomous controller 452 each via a corresponding standardized interface (e.g., interface 540 as described herein below with respect to FIG. 5).

In some implementations, the autonomous controller 452 includes one or more timers. In some examples, the autonomous controller 452 includes a long-term timer 482 and/or interval timers 484. Long-term timer 482 may track time over a long period (e.g., such as a number of minutes, etc.), while the interval timers 484 may track time over short periods or intervals (e.g., such as a number of seconds or microseconds, etc.). In some implementations, the interval timers 484 may be loop timers (e.g., count time in a loop), starting over from zero once a predetermined amount of time has been reached.

The autonomous controller 452 may include a power control 486 in some implementations. In some examples, the power control 486 can switch on or switch off the power to the autonomous controller 452. In some examples, the power control 486 can control the amount of power supplied to and/or consumed by the autonomous controller 452. The power control 486 may limit the power consumption of the autonomous controller 452 to a predefined maximum amount, in some implementations. In some implementations, the power control 486 controls the power supplied to the sub-blocks 410. In some examples, the power control 486 turns power to one or more sub-blocks 410 off or on responsive to a change in state and/or configuration, as explained herein below. Specifically, the power control 486 can turn power off to one or more sub-blocks 410 when the sub-blocks are not in use and/or are in a low-power state. The power control 486 may thus optimize power usage to conserve power in relation to computing resources necessary to carry out a function (e.g., perform analog signal monitoring, processing, analyzing, etc., with respect to the sub-blocks 410).

In some implementations, the autonomous controller 452 includes a mode control 488. The mode control 488 may, in some implementations, control an operating mode of the autonomous controller 452. In some examples, the mode control 488 can initiate a "sleep" mode of the autonomous controller 452 responsive to an amount of time elapsing without receiving a signal. Similarly, the mode control 488 can initiate an "awake" mode responsive to the autonomous controller 452 receiving an input signal (e.g., from sub-blocks 410 and/or another PASS component not illustrated in FIG. 4). Switching between the "sleep" mode and the "awake" mode may be controlled by the power control 486 in some implementations. In some implementations, the mode control 488 can switch the autonomous controller 452 between a synchronous mode and an asynchronous mode. The synchronous mode may correspond to a high-speed mode (HS mode), while the asynchronous mode may correspond to a low-power mode (LP mode). In the synchronous mode, the autonomous controller 452 may be running on the same clock as the CPU. In the asynchronous mode, the autonomous controller 452 may be running on a different clock from the CPU. In some implementations, the autonomous controller 452 maintains the same functionality in the HS mode and the LP mode, however, the clock rate of the autonomous controller 452 may be different. In some examples, the clock rate of the autonomous controller 452 when operating in the HS mode is faster than the clock rate when operating in the LP mode. The slower clock rate in the LP mode may allow the autonomous controller 452 to conserve power and/or other computing resources.

The autonomous controller 452 includes a sequencer 460 and a state table 470. In some implementations, the state table 470 is a data structure to store instructions, actions, and/or parameters related to a number of configuration states and/or predefined PASS states associated with a number of PASS configurations. In some examples, the state table 470 stores conditions, modes, triggers, etc., corresponding to different PASS configurations, which correspond to different PASS states. The state table 470 may contain instructions related to reconfiguration from one state to another. For example, instructions stored in the state table 470 may indicate that the PASS controlled by the autonomous controller 452 is to be in a first PASS state having a first corresponding configuration. The instructions may indicate that upon the expiration of a set amount of time (e.g., tracked by the long-term timer 482 and/or the interval timers 484), the PASS is to be reconfigured to a second PASS state (e.g., one of the sub-blocks 410 is to change from one state to another, etc.) having a second configuration. The instructions may also or alternatively indicate that upon an output value (e.g., of a sub-block 410, of the PASS, etc.) achieving a predetermined threshold amount (e.g., the predetermined threshold amount being specified by a user and stored in the state table 470), the PASS is to be reconfigured to a second PASS state having a second configuration. In some implementations, the instructions may indicate that the autonomous controller 452 is to control one (or more) of the sub-blocks 410 in a first PASS state or a second PASS state. The autonomous controller 452 can thus selectively control one or more sub-blocks in an implemented PASS state.

In some implementations, the sequencer 460 determines instructions (e.g., stored in state table 470) to be executed based on signals and/or time events (e.g., expiration of time) associated with parameters of the states stored in the state table 470. The sequencer 460 may instruct one or more sub-blocks 410 to execute particular instructions in an organized sequence. In some examples, the autonomous controller 452 can receive a trigger (e.g., a trigger condition, a trigger value, etc.) associated with one of an expiration of time or an output value achieving a threshold value. The sequencer 460 may monitor one or more conditions from the sub-blocks 410 prior to and/or after the trigger is received. The sequencer 460 can refer to a state address associated with the trigger, the conditions of the sub-blocks 410, and/or the current PASS state to the state table 470, where an instruction, an action, and/or one or more parameters associated with the next PASS state are stored. The next PASS state may correspond to a state to which a sub-block can be reconfigured, responsive to the trigger condition being met. The instruction can then be issued by the autonomous controller 452 (e.g., to one or more sub-blocks 410). The sub-blocks 410 may receive a control (e.g., a control instruction) based on the instruction, action, and/or parameter(s) associated with the next PASS state that was stored at the state table 470. For example, the sequencer 460 can determine that one or more sub-blocks 410 are to be reconfigured based on the trigger. A control instruction can be issued to the sub-blocks to reconfigure the sub-blocks (e.g., turn one or more sub-blocks 410 on or off, adjust a resolution of one or more sub-blocks 410, etc.).

In some examples, a user, via an interface, can program commands to the autonomous controller 452. The instructions, actions, and/or parameters stored in state table 470 may be set by a user (e.g., input by a user, programmed by a user, etc.). In some examples, the autonomous controller 452 can receive instructions that are converted from plain text instructions (e.g., plain English instructions) input by the user. The plain text instructions may be converted into an executable program by processing logic. The plain text instructions can be simple words and/or phrases indicative of a PASS state and/or a configuration. Further, the plain text instructions can indicate a trigger condition and/or a trigger event that is to instigate the reconfiguration of one or more sub-blocks 410. For example, the plain text instructions may indicate that the PASS (e.g., one or more sub-blocks 410 of the PASS) is to remain in a first state until a trigger event occurs (e.g., expiration of time, output value reaching a threshold, etc.), after which the PASS is to be reconfigured into a second state. The plain text instructions can include simple words and/or phrases indicative of the trigger events. For example, the plain text instructions can recite that a power level is to remain low until an input signal reaches a specified value, then the power level may be changed. In another example, the plain text instructions can recite that a sub-block is to wait for a set amount of time (e.g., 5 seconds), then sample an input signal. In another example, the plain text instructions can recite that a sample rate of a particular sub-block is to change upon receiving a signal that exceeds a threshold value. By utilizing plain text instructions as described herein, the user can quickly and easily program the autonomous controller 452 to perform functions without relying on computing resources of a CPU. In some implementations, the autonomous controller 452 includes a compiler (not illustrated) to convert the plain text instructions into machine-readable instructions.

Figure 5:
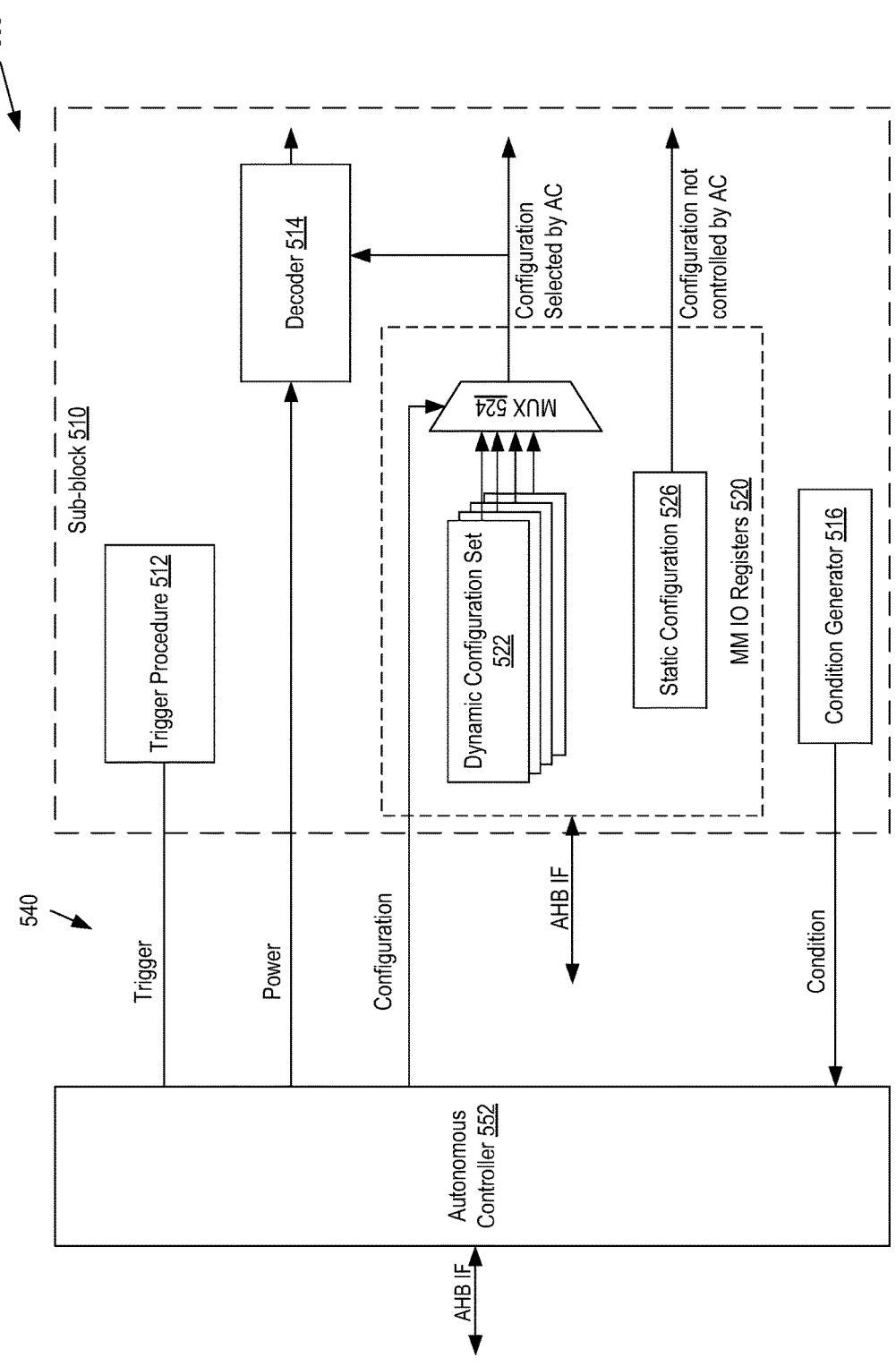
FIG. 5 is a block diagram of one exemplary implementation of a sub-block of a reconfigurable low-power programmable analog subsystem, according to aspects of the present disclosure.

FIG. 5 is a block diagram of one exemplary implementation 500 of a sub-block 510 of a reconfigurable low-power programmable analog subsystem, according to aspects of the present disclosure. In some implementations, the sub-block 510 is an analog sub-block corresponding to sub-blocks 410 of FIG. 4. Sub-block 510 may be configured to monitor, process, amplify, and/or filter, etc., an analog signal received from an analog circuit. In many implementations, sub-block 510 is communicatively coupled to an autonomous controller 552 (e.g., corresponding to autonomous controller 452, 352, 152, etc.) via an interface 540. In some implementations, interface 540 includes a connection for trigger inputs, a connection for power input, a connection for configuration inputs, and/or a connection for condition outputs. In some implementations, regardless of the function of the sub-block 510 (e.g., SAR ADC, AREF, CTB/DTB, AROUTE, etc.), the sub-block 510 includes the connections of interface 540 as described herein. For example, each sub-block (e.g., sub-block 510) included in a PASS may have the same interface (e.g., interface 540) to communicatively couple the sub-block to the autonomous controller.

In some implementations, the sub-block 510 stores a trigger procedure 512. In some examples, a trigger procedure 512 is a set of instructions that, when implemented, cause the sub-block 510 to reconfigure. The sub-block 510 may receive a trigger signal from the autonomous controller (e.g., via interface 540) to execute the trigger procedure 512. Execution of the trigger procedure 512 may be responsive to a changed condition received by the autonomous controller 552 output from the condition generator 516 (e.g., via interface 540). In some examples, upon receiving a trigger signal (e.g., a trigger input) from the autonomous controller 552, the sub-block 510 may initiate a sampling scan (e.g., a SAR scan) or may initiate an output (e.g., a DAC waveform output). In some examples, the sub-block 510 may initiate a function responsive to receiving a trigger signal from the autonomous controller 552.

In some implementations, the sub-block 510 includes a decoder 514. The decoder 514 may receive power enablement signal (e.g., instruction) from the autonomous controller (e.g., via the interface 540). The sub-block 510 may enable analog power and control (e.g., of a coupled analog circuit) via the decoder 514. For example, a corresponding analog circuit may be powered based on a request from the decoder 514.

The sub-block 510 can include MM IO registers 520 in some implementations. The MM IO registers 520 may store a dynamic configuration set 522 (e.g., a selectable set of predetermined configuration states) and/or a static configuration 526. MUX 524 may select a configuration from the dynamic configuration set 522 based on a configuration signal received from the autonomous controller 552 (e.g., via interface 540). In some implementations, the autonomous controller 552 directs the MUX 524 to select a configuration from the dynamic configuration set 522 based on a trigger (such as a trigger event or a trigger value, etc.) and/or based on a changed condition received by the autonomous controller 552 output from the condition generator 516. The MUX 524 may output one or more parameters reflective of (i.e., associated with) the selected configuration to the analog circuit and/or to the decoder 514. In some implementations, the selected configuration includes one or more parameters and/or settings for the sub-block 510 to perform an associated function. In the absence of a configuration signal from the autonomous controller 552, a static configuration 526 may be implemented by the sub-block 510. For example, the sub-block 510 and any associated analog circuits may be in a default state corresponding to the static configuration 526 until the MUX 524 (e.g., under the direction of a configuration signal from the autonomous controller 552) outputs a selected configuration. In some implementations, the sub-block 510 is further communicatively coupled to an associated PASS via an advanced high-performance bus interface (AHB IF). In some implementations, initial configuration of the sub-block 510 is performed via the AHB IF.

In some implementations, the sub-block 510 includes a condition generator 516. The condition generator 516 may output one or more condition signals to the autonomous controller (e.g., via interface 540). In some implementations, the condition generator 516 may output a condition signal responsive to a changing condition of an associated analog circuit. The condition signals may be based on data signals received and/or processed by the sub-block 510. For example, the condition generator 516 may generate a condition signal to be output to the autonomous controller indicative of an analog signal monitored by the sub-block 510 exceeding a threshold value. In another example, the condition generator 516 may generate a condition signal indicative of a sample of analog data. In some implementations, the autonomous controller 552 may determine trigger, power, and/or configuration signals based on the condition signal output by the condition generator 516. In some examples, the autonomous controller 552 may update the configuration signal based on the condition signal, so that the MUX 524 selects a different configuration from the dynamic configuration set 522. The sub-block 510 may then reconfigure from a first state to a second state. In another example, the autonomous controller 552 may turn off the power signal to the sub-block 510 to conserve power responsive to the condition signal indicating a particular condition. Further, the autonomous controller 552 may alter, update, and/or output the trigger signal responsive to the condition signal indicating a particular condition.

Figure 6:
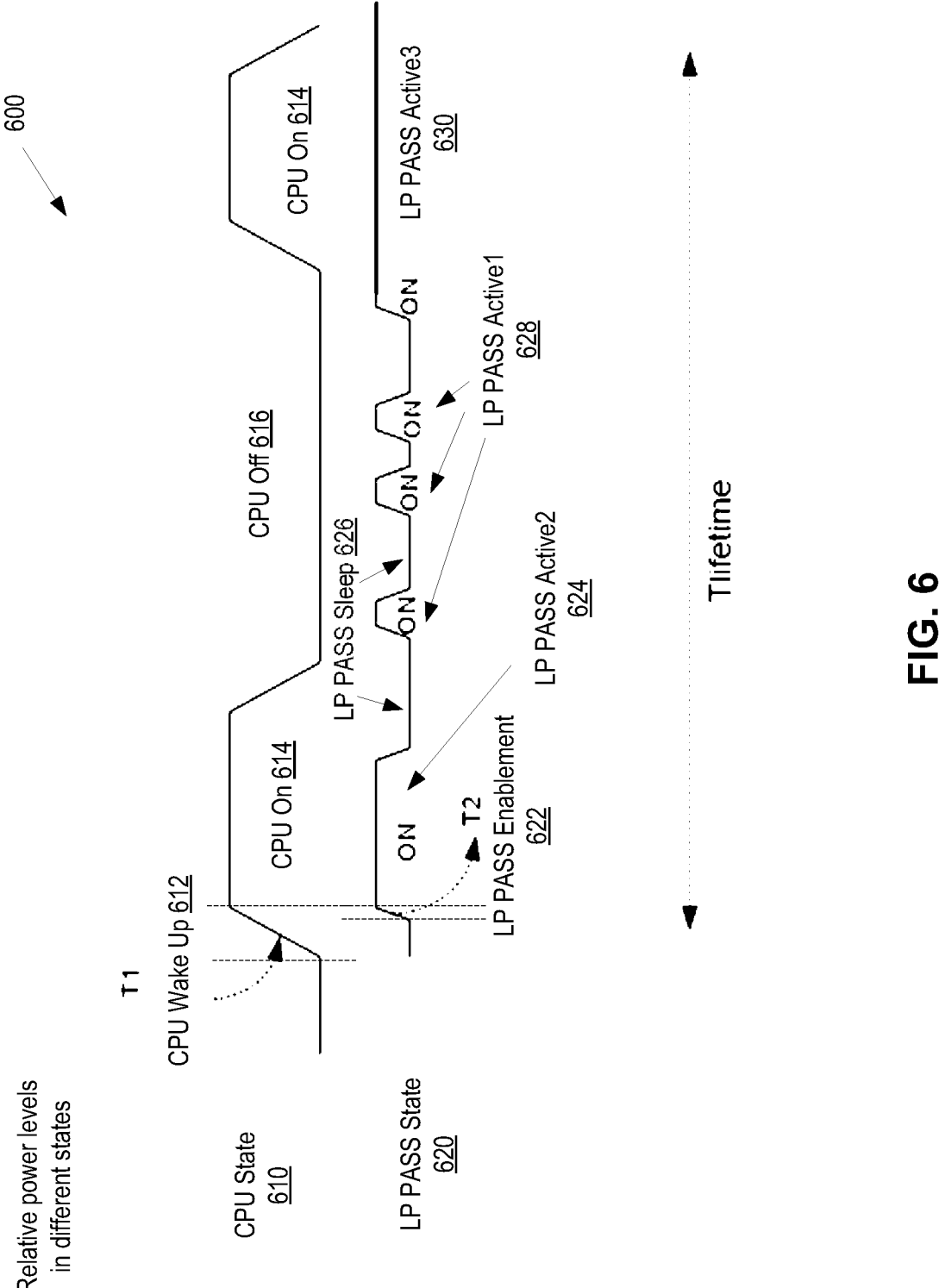
FIG. 6 is a timing diagram showing relative power levels for different states of a system that includes a reconfigurable low-power programmable analog subsystem and a digital subsystem that contains a central processing unit (CPU), for various exemplary states of the two subsystems, in one illustrative implementation, according to aspects of the present disclosure.

FIG. 6 is a timing diagram 600 showing relative power levels for different states of a system that includes a reconfigurable low-power programmable analog subsystem and a digital subsystem that contains a central processing unit (CPU), for various exemplary states of the two subsystems, in one illustrative implementation, according to aspects of the present disclosure. FIG. 6 may illustrate, in qualitative terms, the power levels of any one of the systems shown in FIGS. 3, 4, and 5 as applicable. The upper graph illustrates, in conceptual form and not by way of limitation, the power levels of the digital subsystem, depending on its CPU state. The lower graph illustrates, in conceptual form and not by way of limitation, the power levels of the LP PASS corresponding to its state, which may depend on the configuration of its blocks. Time T1 illustrates, in qualitative terms, a time of CPU wake up (e.g., transition 612) for the CPU (or the entire digital subsystem) to transition from a CPU Off State to a CPU On State. Time T2 illustrates, in qualitative terms, a time of LP PASS wake-up 622 for the LP PASS to transition from the LP PASS Sleep to one of the LP PASS Active states. As shown in FIG. 6, the time T2 may be significantly shorter than the time T1. Furthermore, the power consumption by the digital subsystem in the CPU On State may be significantly greater than in one of the LP PASS Active states (or configuration modes), as depicted schematically by the height of the two graphs.

Depending on the triggering event that wakes up the LP PASS, the LP PASS may be reconfigured into one of the Active states, such as Active1, Active2, Active3, and so on. In the absence of a triggering event, the LP PASS may transition into one of the Active states (by changing configurations of one or more blocks) at specified time intervals, per a wake-up schedule. For example, every 1 second, the LP PASS may transition from LP PASS Sleep state into LP PASS Active1 state, and every 10 seconds, the LP PASS may transition from LP PASS Sleep state into LP PASS Active2 state. Various LP PASS states may differ by LP PASS functionality and power consumption. In some instances, waking up the LP PASS may follow (and be caused by) the waking up of the digital subsystem.

In other implementations, the lengths of time intervals may be much shorter. For example, a period of a duty cycle of the LP PASS may be 50 μs in one implementation, with the first 44 μs of each cycle spent in the LP PASS Sleep state and the next 6 μs spent in the LP PASS Active1 state. In the Sleep state, the LP PASS may be in an ultra-low power state, waiting for a wake-up interrupt. In the Active1 state, the LP PASS may have the analog front-end (e.g., CTB) active with the SAR ADC configured to perform a single conversion, store the result in LP PASS memory, and compare it with the LP PASS reconfiguration or CPU wake-up criteria. Once every N cycles (e.g., N=10), the LP PASS may be reconfigured into the Active2 (or Active3) state with higher (or ultimate) functionality of the LP PASS circuits. The LP PASS may remain in such state for 20 μs (or any other predetermined time), and then revert back to the Sleep state.

A number of various possibilities are illustrated in FIG. 6, by way of example. Before the start of the timeline, the CPU (or the entire digital subsystem) is in the Off State, and the LP PASS is in the Sleep state. At the start of the indicated timeline, the CPU is woken up and undergoes a transition into the On State 614. This transition 612 may be caused by a user, by an external event (such as a wake-up call received over a network), or may occur according to a wake-up schedule. Following the CPU wake-up (e.g., transition 612), the CPU may send an enablement instruction 622 to the LP PASS and reconfigure the LP PASS into one of its active states 624—Active2, as illustrated. Subsequently, the CPU itself undergoes a transition into the CPU Off State 616. With the CPU in the Off State, the LP PASS may experience a series of transitions into one or more of its Active states. These are shown in FIG. 6 as LP PASS Active1 628 states. Some of these states may be performed as disclosed above. For example, the LP PASS may be monitoring outside analog inputs, generating digital outputs, and comparing the digital outputs to one or more criteria (e.g., threshold values) to determine whether to reconfigure the LP PASS. Some of the reconfigurations may occur after a predetermined time interval has elapsed without the output value meeting the reconfiguration criteria. After the LP PASS has accomplished the necessary tasks during its Active1 628 stints (such as speech monitoring or adjusting heating/ac settings), the LP PASS may return into the LP PASS Sleep states 626. In some instances, the output values may be such that criteria for reconfiguration of the LP PASS into a third—e.g., the LP PASS Active3 630—state are met. In addition to reconfiguring itself into Active3, the LP PASS may (as shown in FIG. 6) send wake-up instructions to the CPU and cause its transition into the CPU On State 614. The examples shown in FIG. 6 are not exhaustive, as many other combinations and scenarios are possible. For example, in addition to the two CPU states (CPU On and CPU Off), other additional states of the digital subsystem are possible that may differ by the level of CPU functionality and power consumption. The drawings of FIG. 6 are illustrative and should not be interpreted restrictively. For example, although the power consumption in the three LP PASS states is shown at the same level, in general, this does not have to be so, and various LP PASS states may be characterized by different levels of power consumption.

FIG. 7 is a flow diagram of one possible implementation of a method 700 of reconfiguration, in response to a trigger, of a low-power programmable analog subsystem, according to aspects of the present disclosure. Method 700 may be performed by an autonomous controller and/or FSM of the LP PASS that may include hardware (e.g., circuitry, dedicated logic, programmable logic, microcode, etc.), software, firmware, or a combination thereof. The LP PASS may be one of the LP PASSs 102 or 302. The autonomous controller may be one of the autonomous controllers 152, 352, 452, or 552.

The method 700 may include receiving a first input signal from an JO device by a programmable analog subsystem (PASS) coupled to the JO device at block 710. The PASS may include multiple reconfigurable analog circuits, an interface to communicate data with a CPU, and a controller (e.g., an autonomous controller) to control the multiple reconfigurable analog circuits. In some implementations, the controller is configured to control the reconfigurable analog circuits based on a plurality of parameters stored at the controller. In some implementations, the controller may operate independently of the CPU (i.e., autonomously, semi-autonomously, etc.). The IO device can be any device capable of inputting analog signals. The IO device can include one or more pins, switches, and/or sensors. In some implementations, the IO device may include a radio front-end processing, a coaxial cable, an optoelectronic fiber, and so on.

The method 700 may continue with processing, with the PASS in a first PASS state, the first input signal through the multiple reconfigurable analog circuits at block 720. In some implementations, the reconfigurable analog circuits have a first configuration corresponding to the first PASS state. The reconfigurable PASS circuits may include some or all of the circuits shown in FIGS. 1-5, such as CTB, SAR ADC, AROUTE, AREF, multiplexers, sub-blocks 410 and 510, and the like.

The method 700 may continue with generating a first output value based on the first input signal at block 730. For example, the SAR ADC may provide a digital input to the autonomous controller and/or FSM of the PASS. The autonomous controller and/or FSM may generate the first digital output value that may be representative of the analog input to the PASS.

Responsive to a trigger event (e.g., as described herein), the method 700 may continue with reconfiguring functionality of the reconfigurable analog circuits into a second PASS state at block 740. In many implementations, the second PASS state is different from the first PASS state. As described herein, the trigger event can be the expiration of a set amount of time and/or the first output value achieving a predetermined threshold amount. In some implementations, the reconfiguration may be performed for the PASS to perform a function, such as receiving a second input signal or outputting an output signal based on the first input signal. In some implementations, the correspondence may be an index stored in one or more registers (e.g., ROM-based registers) of the PASS and/or in one or more memory devices (e.g., RAM) of the PASS. In some implementations, the correspondence may reference one or more threshold values stored by the PASS. In some implementations, a PASS configuration is to be selected if the first output value is greater than a threshold value. In some implementations, a PASS configuration is to be selected if the first output value is less than a threshold value. In some implementations, reconfiguring the plurality of reconfigurable analog circuits into a second PASS state may be performed by selecting a predefined configuration from a set of configurations. In some implementations, settings for some or all of the analog circuits of the PASS may be obtained based on a selected configuration. One or more related settings and/or parameters may be stored in a state table of the autonomous controller. The settings may be based on plain text instructions input to the autonomous controller from user input.

Figure 8:
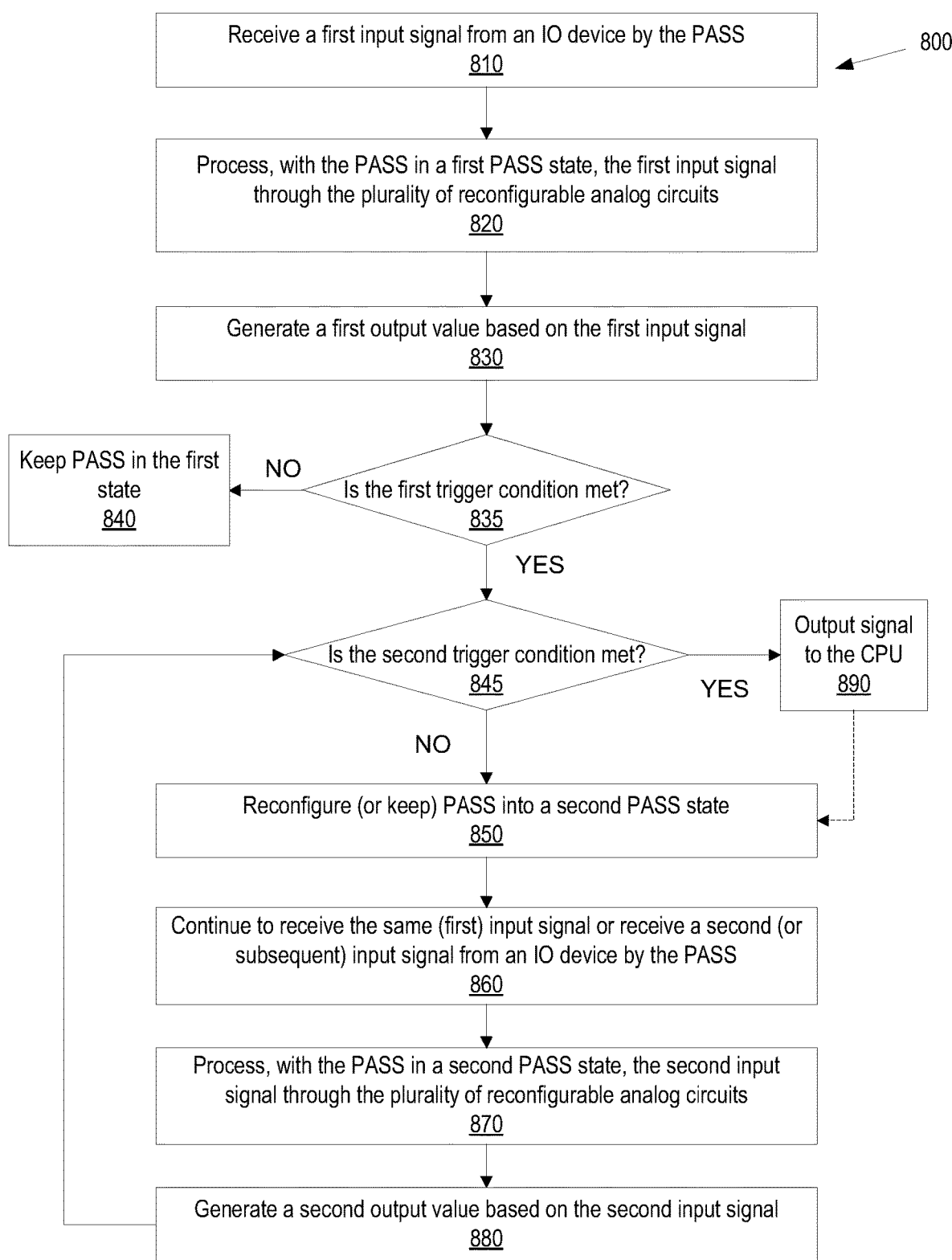
FIG. 8 is a flow diagram of one possible implementation of a method of reconfiguration, in response to a trigger, of a low-power programmable analog subsystem integrated with a digital subsystem, according to aspects of the present disclosure.

FIG. 8 is a flow diagram of one possible implementation of a method 800 of reconfiguration, in response to a trigger, of a low-power programmable analog subsystem integrated with a digital subsystem, according to aspects of the present disclosure. Method 800 may be performed by the same devices and circuits as described above in relation to method 700.

The method 800 may include receiving a first input signal from an IO device by the PASS coupled to the IO device at block 810. The PASS may have a plurality of reconfigurable analog circuits and an interface to communicate data with a CPU. The method 800 may continue with processing, with the PASS in a first PASS state, the first input signal through the plurality of reconfigurable analog circuits at block 820. The method 800 may continue with generating a first output value based on the first input signal at block 830. The blocks 810-830 may be the same as the blocks 710-730 of the method 700, in some implementations.

The method 800 may continue with a decision-making block where it may be determined whether the first trigger condition is met at block 835. Determining whether the first trigger condition is met may be based on the first output (e.g., generated at block 830). For example, it may be determined by the autonomous controller whether carbon monoxide concentration has reached a detectable level (e.g., the first trigger condition). In another example, it may be determined by the autonomous controller whether a set amount of time has expired. If the first trigger condition is not met, the PASS may remain in the first PASS state at block 840. If, however, it is determined that the first trigger condition is met, the method 800 may continue with determining whether the second trigger condition is met at block 845. Determining whether the second trigger condition is met may be based on a second output. For example, at block 845, it may be determined whether carbon monoxide concentration has reached a dangerous level (e.g., the second trigger condition). If the second trigger condition is not met, the method 800 may continue with reconfiguring the plurality of reconfigurable analog circuits into a second PASS state at block 850 different from the first PASS state. In some implementations, block 850 may be performed similarly to block 740 of the method 700. For example, the first configuration (e.g., of the first PASS state) may be used to implement the LP PASS Sleep state, and the second configuration (e.g., of the second PASS state) may be used to implement the LP PASS Active1 state. In other instances, the first configuration may be used to implement the LP PASS Active1 state, and the second configuration may be used to implement the LP PASS Active2 state. The method 800 may continue with the LP PASS receiving a subsequent (e.g., second) input signal from an IO device at block 860. In some implementations, the second input signal may be the same as the first input signal but stored by one or more analog circuits for later re-processing by the PASS in the second configuration (which may have a higher resolution and/or accuracy of processing).

The method 800 may continue with processing, with the PASS in the second PASS state, the second input signal through the plurality of reconfigurable analog circuits at block 870, and generating a second output value based on the second input signal at block 880. The actions in the blocks 870-880 may be performed similarly to the actions in the blocks 810-830. The method may then loop back to the decision-making block 845 and compare the second output with the second trigger condition again. In the case the second trigger condition has not been met, the method may continue with keeping the PASS in the second PASS state and repeating blocks 850-880 and 845, as needed. In case the second trigger condition has been met, the method 800 may proceed with outputting a signal to the CPU at block 890 (such as a wake-up or interrupt instruction, in some implementations) through an interface (such as a digital interface 455). If it is determined that both the first criteria (block 835) and the second criteria (block 845) are satisfied while the PASS is still in the first PASS configuration, the method 800 may continue with waking up the CPU at block 890 and also (as shown by the dashed line) reconfiguring the PASS into the second PASS configuration. In some implementations, this action may be optional, and the method 800 may conclude when the CPU takes over the input signal processing.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware, or code set forth above may be implemented via instructions or code stored on a machine-accessible, machine readable, computer accessible, or computer-readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplary language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
an input/output (IO) device to receive a first input signal; and
a programmable analog subsystem (PASS) coupled to the IO device, wherein the PASS comprises:
a plurality of reconfigurable analog circuits;
an interface to communicate data with a central processing unit (CPU); and
an autonomous controller circuit to control the plurality of reconfigurable analog circuits, the autonomous controller comprising at least one timer circuit and at least one control circuit, wherein the autonomous controller circuit is configured, based on a plurality of parameters stored at the autonomous controller circuit, to:

select a predefined configuration from a set of configurations stored in a state table stored in the autonomous controller circuit, wherein the at least one timer circuit is configured to track time intervals for triggering reconfiguration of the plurality of reconfigurable analog circuits;

configure the plurality of reconfigurable analog circuits into a first active PASS state, wherein the PASS is to process the first input signal through the plurality of reconfigurable analog circuits in the first active PASS state to generate a first output value based on the first input signal;

determine, by a sequencer circuit of the autonomous controller, a reconfiguration of the plurality of reconfigurable analog circuits from the first active PASS state to a second active PASS state different from the first active PASS state based on the one or more parameters stored at the state table; and responsive to a trigger event, autonomously output instructions to at least one of the plurality of reconfigurable analog circuits, the instructions to reconfigure the plurality of reconfigurable analog circuits into the second active PASS state, wherein the PASS is to receive a second input signal or output an output signal via one or more of the plurality of reconfigurable analog circuits in the second active PASS state based on the first output value.

2. The apparatus of claim 1, wherein the plurality of reconfigurable analog circuits have a higher operating power in the second active PASS state than in the first active PASS state.

3. The apparatus of claim 1, wherein the autonomous controller circuit comprises:

the state table configured to store the one or more parameters of a plurality of predefined active PASS states; and the sequencer circuit, wherein the sequencer circuit is configured to determine instructions based on at least one of the timer or the parameters stored at the state table.

4. The apparatus of claim 1, wherein the autonomous controller circuit is further configured to:

receive plain text instructions input by a user, wherein the plain text instructions are indicative of one or more of the first active PASS state or the second active PASS state; and configure the plurality of reconfigurable analog circuits into one or more of the first active PASS state or the second active PASS state based on the plain text instructions.

5. The apparatus of claim 1, wherein the trigger event comprises at least one of:

an expiration of a set amount of time; or the first output value achieving a predetermined threshold amount.

6. The apparatus of claim 1, wherein the autonomous controller circuit is to selectively control one or more of the plurality of reconfigurable analog circuits in at least the first active PASS state or the second active PASS state via a corresponding standardized interface of each of the plurality of reconfigurable analog circuits.

7. The apparatus of claim 1, wherein the reconfigurable analog circuits comprise one or more of:

a continuous time block (CTB) circuit for executing signal processing in a continuous time domain;

an analog-to-digital converter (ADC) circuit to process an output of the CTB; or one or more multiplexers to selectively connect a plurality of pins of the IO device to a plurality of inputs of at least of one of the CTB or the ADC circuit.

8. The apparatus of claim 7, wherein the reconfigurable analog circuits further comprise at least one of:

an analog reference block to provide at least one of a voltage reference, a current reference, or a clock signal; or a finite state machine having a plurality of states selectable according to an output of the autonomous controller circuit.

9. A system comprising:

an input/output (IO) device to receive a first input signal from a signal source;

a digital subsystem comprising a memory and a central processing unit (CPU) coupled to the memory;

a programmable analog subsystem (PASS) coupled to the IO device and to the digital subsystem, wherein the PASS comprises:

a plurality of reconfigurable analog circuits; and an interface to communicate data with the CPU; and an autonomous controller circuit to control the plurality of reconfigurable analog circuits, the autonomous controller comprising at least one timer circuit and at least one control circuit, wherein the autonomous controller circuit is configured, based on a plurality of parameters stored at the autonomous controller circuit, to:

select a predefined configuration from a set of configurations stored in a state table stored in the autonomous controller circuit, wherein the at least one timer circuit is configured to track time intervals for triggering reconfiguration of the plurality of reconfigurable analog circuits;

configure the plurality of reconfigurable analog circuits into a first active PASS state, wherein the PASS is to process the first input signal through the plurality of reconfigurable analog circuits in the first active PASS state to generate a first output value based on the first input signal;

determine, by a sequencer circuit of the autonomous controller, a reconfiguration of the plurality of reconfigurable analog circuits from the first active PASS state to a second active PASS state different from the first active PASS state based on the one or more parameters stored at the state table; and responsive to a trigger event, autonomously output instructions to at least one of the plurality of reconfigurable analog circuits, the instructions to reconfigure the plurality of reconfigurable analog circuits into the second active PASS state, wherein the PASS is to receive a second input signal or output an output signal via one or more of the plurality of reconfigurable analog circuits in the second active PASS state based on the first output value.

10. The system of claim 9, wherein the plurality of reconfigurable analog circuits have a higher operating power in the second active PASS state than in the first active PASS state.

11. The system of claim 9, wherein the autonomous controller circuit comprises:

state table configured to store the one or more parameters of a plurality of predefined active PASS states; and the sequencer circuit, wherein the sequencer circuit is configured to determine instructions based on at least one of the timer or the parameters stored at the state table.

12. The system of claim 9, wherein the autonomous controller circuit is further configured to:

receive plain text instructions input by a user, wherein the plain text instructions are indicative of one or more of the first active PASS state or the second active PASS state; and configure the plurality of reconfigurable analog circuits into one or more of the first active PASS state or the second active PASS state based on the plain text instructions.

13. The system of claim 9, wherein the trigger event comprises at least one of:

an expiration of a set amount of time; or the first output value achieving a predetermined threshold amount.

14. The system of claim 9, wherein the autonomous controller circuit is to selectively control one or more of the plurality of reconfigurable analog circuits in at least the first active PASS state or the second active PASS state via a corresponding standardized interface of each of the plurality of reconfigurable analog circuits.

15. The system of claim 9, wherein the reconfigurable analog circuits comprise one or more of:

a continuous time block (CTB) circuit for executing signal processing in a continuous time domain;

an analog-to-digital converter (ADC) circuit to process an output of the CTB; or one or more multiplexers to selectively connect a plurality of pins of the IO device to a plurality of inputs of at least of one of the CTB or the ADC circuit.

16. The system of claim 15, wherein the reconfigurable analog circuits further comprise at least one of:

an analog reference block to provide at least one of a voltage reference, a current reference, or a clock signal; or a finite state machine having a plurality of states selectable according to an output of the autonomous controller circuit.

17. A method comprising:

receiving a first input signal from an input/output (IO) device by a programmable analog subsystem (PASS) coupled to the IO device, the PASS comprising a plurality of reconfigurable analog circuits, an interface to communicate data with a central processing unit (CPU), and an autonomous controller circuit comprising at least one timer circuit and at least one control circuit, the autonomous controller to control the plurality of reconfigurable analog circuits based on a plurality of parameters stored at the autonomous controller circuit;

processing, with the PASS in a first active PASS state, the first input signal through the plurality of reconfigurable analog circuits;

generating a first output value based on the first input signal;

selecting a predefined configuration from a set of configurations stored in a state table stored in the autonomous controller circuit, wherein the at least one timer circuit is configured to track time intervals for triggering reconfiguration of the plurality of reconfigurable analog circuits;

determining, by a sequencer circuit of the autonomous controller, a reconfiguration of the plurality of reconfigurable analog circuits from the first active PASS state to a second active PASS state different from the first active PASS state based on the one or more parameters stored at the state table; and responsive to a trigger event, reconfiguring functionality of the plurality of reconfigurable analog circuits into the second active PASS state based on instructions autonomously output from the autonomous controller circuit.

18. The method of claim 17, wherein the plurality of reconfigurable analog circuits have a higher operating power in the second active PASS state than in the first active PASS state.

19. The method of claim 17, wherein reconfiguring the plurality of reconfigurable analog circuits into the second active PASS state is responsive to the trigger event, wherein the trigger event comprises at least one of:

an expiration of a set amount of time; or the first output value achieving a predetermined threshold amount.

20. The method of claim 17, further comprising:

processing, with the PASS in the second active PASS state, a second input signal through the plurality of reconfigurable analog circuits;

generating a second output value; and responsive to the second output value, outputting, through the interface, a signal to the CPU.

* * * * *